Nov. 25, 1969    J. H. LUMN    3,480,231
LIGHTNING PROTECTION FOR AIRCRAFT COMPONENTS
Filed May 31, 1967

INVENTOR
John H. Lumn

BY *Strauch, Nolan, Neale, Nies & Kurz*
ATTORNEYS

# United States Patent Office 3,480,231
Patented Nov. 25, 1969

3,480,231
LIGHTNING PROTECTION FOR AIRCRAFT COMPONENTS
John H. Lumn, El Cajon, Calif., assignor, by mesne assignments, to Ametek, Inc., New York, N.Y., a corporation of Delaware
Filed May 31, 1967, Ser. No. 642,492
Int. Cl. B65g 45/02
U.S. Cl. 244—1                                7 Claims

ABSTRACT OF THE DISCLOSURE

A lightning protection system for aircraft components apt to be struck by lightning such as wings, external fuel tanks, etc. including a thin ceramic coating covering the leading portion of the component to be protected and a conductive coating superimposed on the ceramic coating and electrically connected to a ground or dispersal area together with a method for applying the coatings.

BACKGROUND, SUMMARY, AND OBJECTS OF THE INVENTION

The present invention relates to lightning protection systems and, more specifically, to systems for and methods of protecting aircraft and other aeronautical vehicles against damage from lightning strikes.

Modern aircraft have a number of components which are apt to be struck by lightning such as the fuselage, wings, tail assembly, and external fuel tanks. For the most part the lightning strikes are received on the forward or leading edges of these components.

Lightning strikes are capable of producing such intense concentrations of electrical energy as to physically damage the aircraft component they strike by puncturing and/or overheating it. They are accordingly particularly dangerous where the component struck is a fuel tank or other fuel-containing component since the result may be ignition of the fuel in the component struck by lightning.

An important and primary object of this invention is the provision of novel, improved methods of and systems for protecting aircraft components susceptible to lightning strikes against damage from such strikes.

A related important and primary object of the invention resides in novel, improved methods of and systems for preventing lightning from igniting fuel in external tanks and other fuel-containing aircraft components struck by lightning.

The foregoing and other important objects of the present invention are accomplished by covering the leading portion of the component to be protected with a thin coating of a temperature resistant ceramic material having good electrical insulating properties and therefore capable of withstanding the highly intense concentrations of electrical energy produced by lightning strikes. Superimposed on the ceramic coating and extending beyond it to provide a conductive path to a charge dissipating or dispersing area such as the erternal surfaces of the fuselage, wings, or other aircraft components or combinations of these components is a coating of a highly conductive material such as aluminum. This combination of insulating and conductive coatings provides highly effective protection against lightning strikes since the ceramic coating protects the coated component against puncture, heat, and other damage for the brief instant necessary for the concentrated electrical charge to run along the conductive coating to the charge dissipating area of the aircraft.

The insulating and conductive coatings discussed above are preferably applied by the flame spray technique. This permits the use of materials which could not otherwise be applied to aircraft skin, makes it possible to produce a much better mechanical bond and to more accurately control the thickness and homogeneity than would otherwise be possible and results in a lightning protection system having a long service life. At the same time the flame spray process permits the coatings to be applied quickly and easily and at relatively low cost.

Several approaches to the dissipation of lightning and other static electricity concentrations on aircraft components have heretofore been proposed. One of these, described in U.S. Patent 2,616,638 to George, involves the use of a lead coating capable of acquiring a positive static charge on the leading edges of wings and the like to neutralize negative static charges acquired in flying through snow or ice crystals. This approach would not be satisfactory for the purposes of the present invention since a lead coating does not have the combination of high dielectric strength and high conductivity necessary to handle the intense concentrations of electrical energy produced by lightning strikes.

Another approach to the problem of dissipating concentrations of static electricity from aircraft surfaces, discussed in U.S. Patent No. 2,397,118 to Bennett, involves a rubber coating on the components to be protected on which spaced apart bands of conductive material are superimposed. Like that disclosed in the George patent, the Bennett system is intended only to dissipate static charges caused by flying through precipitation. And, like the latter, it would not be capable of handling the intense concentrations of electrical energy produced by lightning strikes since rubber coatings do not have sufficiently high insulating properties to withstand intense electrical concentrations and because the system lacks a continuous path for conducting the charge to the dispersal area.

Moreover, rubber, as used in the Bennett system, would not be capable of withstanding the temperature extremes to which the external surfaces of modern, high speed aircraft are subjected. Therefore, this material would not be at all satisfactory for the purposes of the present invention.

A third approach to the problem of static electricity dissipation in aircraft is described in Reissue Patent No. 25,417 to Amason. The Amason system is limited in use to the protection of components made of an acrylic or similar material having a high dielectric coefficient. Accordingly, it cannot be employed to protect aircraft components having a metal skin. Therefore, the Amason system is not suitable for the purposes of the present invention which is concerned with the protection of aircraft components which are typically fabricated from metallic materials.

From the foregoing it will be apparent that other important but more specific objects of the present invention reside in the provision of novel, improved lightning protection systems for aircraft, which:

(1) comprise a combination of electrical insulating-temperature resistant and conductive coatings capable of withstanding and rapidly dispersing the intense concentrations of electrical energy produced by lightning strikes.

(2) in conjunction with the preceding object, consist of coatings which can be applied by and take advantage of the benefits resulting from the flame spray coating technique.

(3) are capable of withstanding the temperature extremes to which modern, high-performance aircraft are subjected and will not deteriorate under such conditions.

(4) are applicable to all aircraft components which it may be desired to protect against lightning strike damage.

(5) are relatively simple and inexpensive.
(6) are easily and quickly provided.
(7) have a long service life.

Other important objects, additional advantages, and further novel features of the present invention will become apparent from the appended claims and as the ensuing detailed description and discussion of an exemplary embodiment of the invention proceeds in conjunction with the accompanying drawing.

DETAILED DESCRIPTION OF AN EXEMPLARY PREFERRED EMBODIMENT OF THE INVENTION

Figure 1:
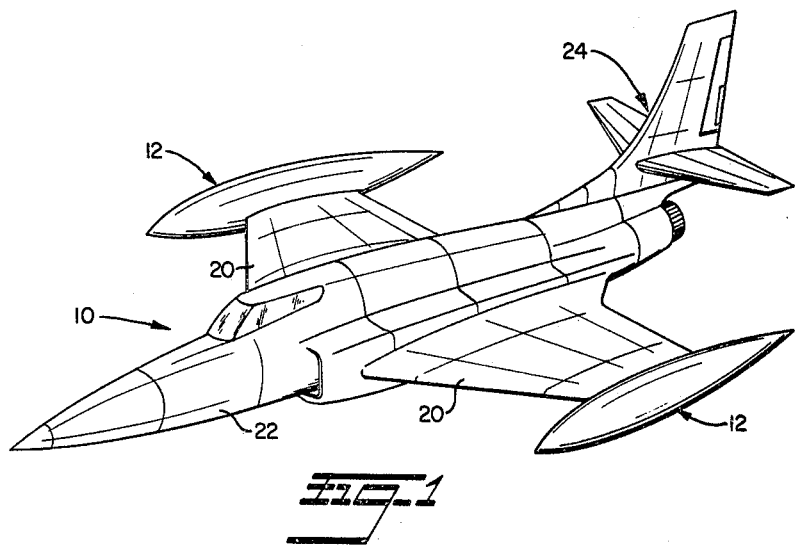
FIGURE 1 is a pictorial view of an aircraft having components of the type which are adapted to be protected against lightning in accord with the principles of the present invention.
Figure 2:
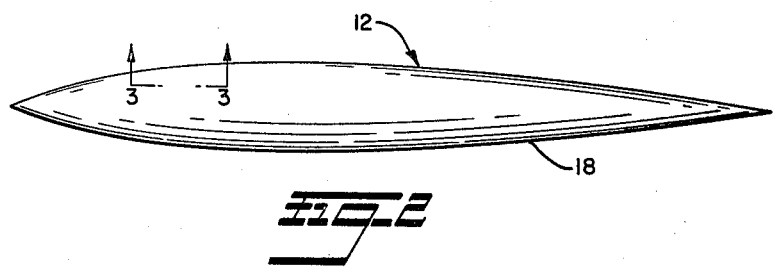
FIGURE 2 is a side view of a wingtip fuel tank incorporated in the aircraft of FIGURE 1 and protected against lightning strikes in accord with the invention.

Referring now to the drawing, FIGURE 1 depicts an aircraft 10 which may be protected against lightning strike damage in accord with the principles of the present invention. Among the components of aircraft 10 most apt to be struck by lightning are wingtip fuel tanks 12 (see also FIGURE 2). Lightning striking wingtip tanks 12 is particularly dangerous since it may damage and ignite the fuel in the tank.

To protect wingtip tanks 12 from lightning strike damage in accord with the principles of the present invention, a thin coating 14 of ceramic material (see FIGURE 3) is first applied to the leading portion of each tank to protect it against the heat and physical damage which may be caued by the intense concentrations of electrical energy caused by lightning strikes.

One suitable material for coating 14 is pure grade aluminaoxide, which is resistant to extremenely high temperatures and has excellent electrical insulation properties. Other ceramic materials with similar properties such as chrome and zirconia oxides, etc. can also be used, if desired.

The insulating material is typically applied in a layer having a thickness of approximately 0.020–0.040 inch. The thickness of the ceramic layer may, however, be varied as necessary for particular applications of the invention.

In the practice of the present invention the ceramic coating is preferably applied by the flame spray technique to produce a strong mechanical bond between the ceramic material and the surface to which it is applied, to obtain a homogenous layer of the coating material on the component to be protected, and to provide accurate control of the thickness of material applied.

In the flame spray process, the coating material is applied by reducing it to molten particles and projecting the particles at high velocity against the surface to be coated, the particles solidifying and adhering to the surface as they strike it. The flame spray coating technique is described in detail in various publications available from the Norton Company and from the assignee of the present invention. For this reason and because the details of this process are not part of the present invention, it is not considered necessary to describe it in more detail herein.

For a typical wingtip tank, the ceramic coating will extend from the tip of the tank rearwardly for a distance of approximately 36 inches. This distance will of course vary depending upon the size, configuration, etc. of the tank or other aircraft component to be protected.

Following the step described above, a thin layer 16 of a conductive material such as pure aluminum is applied to the layer of ceramic material 14. This layer will typically be 0.020–0.050 inch thick, but may vary beyond these limits for particular applications of the invention.

Figure 3:
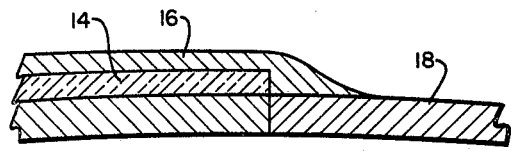
FIGURE 3 is a section through the fuel tank of FIGURE 2, taken substantially along line 3—3 of the latter figure.

As shown in FIGURE 3, conductive layer or coating 16 is extended beyond ceramic coating 14 and bonded to the skin 18 of wingtip tank 12. This provides a conductive path along which the electrical charge produced by lightning striking wingtip tank 12 may run off into a dispersal or charge dissipating area. In the illustrated embodiment of the present invention, the charge dissipating area may include the external surfaces of wingtip tanks 12 and, in addition, the external surfaces of wings 20, fuselage 22, and the members of tail assembly 24 of aircraft 10, making rapid dissipation of the charge possible.

The rapid dissipation of electrical charges along conductive coating 16 together with the resistance to heat and other physical damage from such charges provided by coating 14 combine to prevent even highly intense electrical charges from damaging the protected component or components. Accordingly, this combination of ceramic and conductive coatings provide highly effective protection against lightning strikes.

Outer conductive coating 16 is preferably applied by the same flame spray technique as ceramic coating 14. By using this technique, an extremely good mechanical bond can be obtained between the two coatings; and, as in the case of the ceramic coating, the thickness and homogeneity of the coating can be closely controlled.

In the case of supersonic aircraft, external surfaces of the aircraft may reach temperatures approaching the melting point of pure aluminum. Accordingly, in applications of the present invention to supersonic aircraft, a conductive material with a higher melting point, such as a nickel-chrome alloy, is employed rather than aluminum in outer coating 16. Alumina oxide and other materials of the type preferred for inner coating 14 will of course easily withstand the temperatures reached on the external surfaces of supersonic aircraft.

Components of aircraft 10 in addition to wingtip tanks 12 are susceptible to lightning strikes. These include fuselage 22, wings 20, and the members of tail assembly 24. The foregoing components can be protected against lightning strike damage in the same manner as wingtip tanks 12.

It will also be apparent from the foregoing that the principles of the present invention can equally well be applied to other externally carried fuel tanks such as pylon and belly tanks and to aeronautical vehicles other than airplanes. Accordingly, to the extent that such other applications of the present invention not described in detail herein are not excluded from the appended claims, they are fully intended to be covered therein.

The invention may be embodied in other specific forms without departing from the spirit or essential characteristics thereof. The present embodiment is therefore to be considered in all respects as illustrative and not restrictive, and all changes which come within the meaning and range of equivalency of the claims are therefore intended to be embraced therein.

What is claimed and desired to be secured by Letters Patent is:

1. The combination of an aeronautical vehicle having an electrically conductive component which has a relatively sharp leading edge and is therefore susceptible to being struck by lightning and means for preventing lightning striking said component from damaging the component, said last-named means comprising a coating of a temperature resistant electrical insulating material having a high degree of physical integrity covering at least the leading edge of said component to reduce the possibility that lightning striking the component will penetrate through or heat damage the component and a coating of an electrically conductive material superimposed on said insulating coating, said coating of electrically conductive material being continuous and completely covering the insulating coating and, further, being extended beyond said insulating coating and being bonded to the component for conducting electricity from the coated portion of the component to effect a dispersal thereof.

2. The combination of claim 1, wherein said insulating coating is a refractory ceramic material bonded to the leading part of the protected component.

3. The combination of claim 1, wherein the conductive material superimposed on the electrically insulating material is a thin coating of aluminum bonded to said insulating material.

4. The combination of claim 1, wherein the conductive material superimposed on the electrically insulating material is a thin layer of a chrome-nickel alloy bonded to said insulating material.

5. The method of protecting aircraft components which are fabricated of electrically conductive material and have relatively sharp leading edges against damage from lightning strikes and the like, comprising the steps of covering at least the lead portion of each component to be protected with a first coating of a temperature resistant electrical insulating material having a high degree of physical integrity and a second continuous superimposed coating of an electrically conductive material which completely covers said first coating and extending said second coating beyond said first coating and bonding it to the component to be protected so that said second coating will conduct electricity from the coated portion of the component to effect a dispersal thereof.

6. The method of claim 5, wherein said first coating is applied by spraying the insulating material onto the component to be protected in molten form.

7. The method of claim 5, wherein the second coating is applied by spraying the electrically conductive material onto the component to be protected in molten form.

References Cited

UNITED STATES PATENTS

| 1,419,261 | 6/1922 | Howard | 244—1 |
| 2,583,540 | 1/1952 | Bennett | 250—33 |
| 2,815,395 | 12/1957 | Donelli | 174—4 |
| 3,236,476 | 2/1966 | White | 244—1 |
| 3,372,054 | 3/1968 | Wishnie | 117—105.2 |
| Re. 25,417 | 7/1963 | Amason | 244—1 |

OTHER REFERENCES

Handbook of Chemistry and Physics: Chemical Rubber Publishing Co., Cleveland, 1960, pp. 1528 and 1534.

The Metco Flame Spraying Processes: Metallizing Engineering Co., Inc., Westbury, N.Y., 1960, Bulletin 136B, pp. 1, 8 and 10.

Powders for Flame Spraying: Metallizing Engineering Co., Inc., Westbury, N.Y., 1963, Bulletin 10F 1/M 8–63.

MILTON BUCHLER, Primary Examiner

J. L. FORMAN, Assistant Examiner

U.S. Cl. X.R.

317—2